April 18, 1961 W. W. BRADLEY 2,980,059
EGG INCUBATOR
Filed Feb. 24, 1959
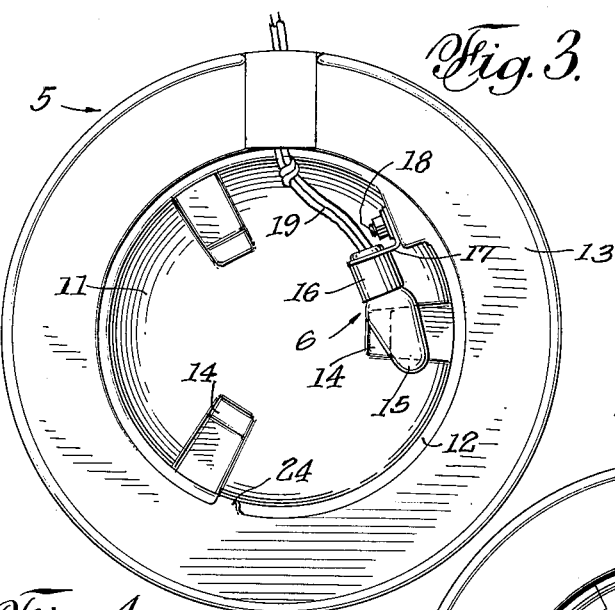
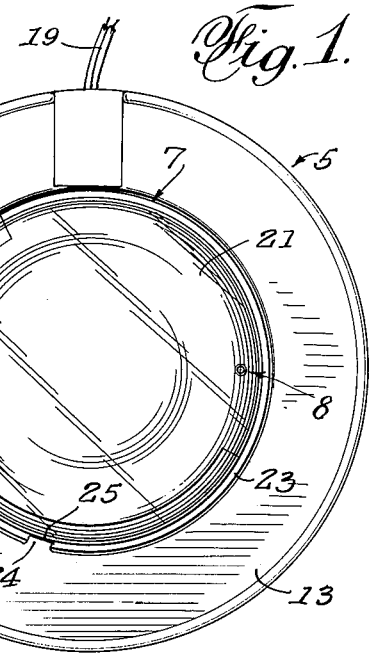
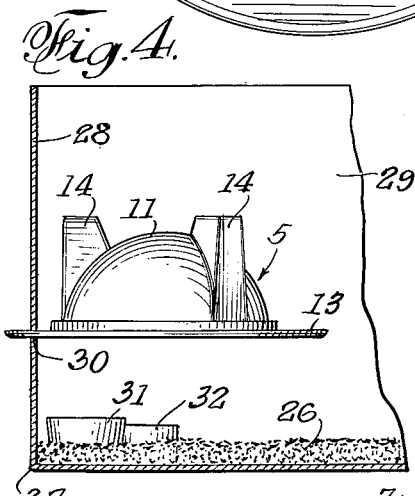
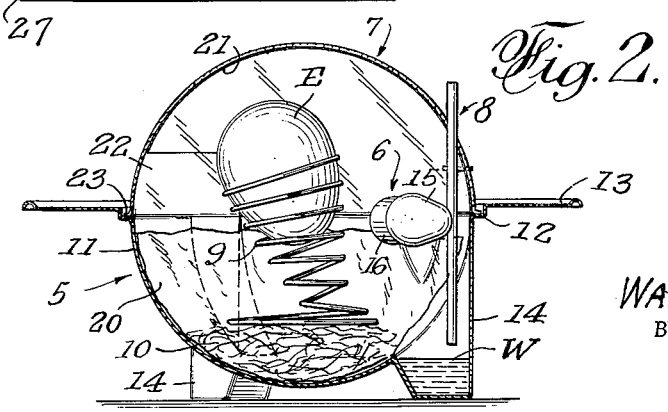
INVENTOR.
WALTER W. BRADLEY
BY C. G. Stratton
ATTORNEY United States Patent Office 2,980,059
Patented Apr. 18, 1961

2,980,059
EGG INCUBATOR
Walter W. Bradley, La Crescenta, Calif., assignor to John W. Knox, Los Angeles, Calif.
Filed Feb. 24, 1959, Ser. No. 794,989
8 Claims. (Cl. 119—37)

This invention relates to a small, such as a single egg incubator that, in part, is also usable as a brooder.

An object of the invention is to provide a lightweight and inexpensive covered housing in which is embodied means to hold an egg to be hatched and to heat and humidify the interior of the housing so that the atmosphere is conducive to efficient hatching of a chick.

Another object of the invention is to provide a novel housing that provides for uniform heat distribution as well as establishing air circulation for efficient egg-hatching purposes.

A further object of the invention is to provide an enclosed incubator of the character above referred to with means to view the condition of an egg being hatched without uncovering the egg.

A still further object of the invention is to provide an incubator having a base part that is adapted, in inverted condition, to be used as a brooder for a chick hatched in the same when used as an incubator.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a top plan view of an incubator embodying a preferred form of the present invention.

Fig. 2 is a vertical sectional view thereof.

Fig. 3 is a plan view of the base portion of said incubator.

Fig. 4, to a reduced scale, is a sectional view of a box fitted with the base of the present incubator, thereby forming a brooder.

The incubator that is illustrated comprises, generally, a base housing 5, means 6 to heat the interior of said housing, a removable cover 7 for the housing to enclose the interior thereof, a vent 8 carried by the cover to establish circulation of air in the housing, means 9 to support an egg E in the housing in proper hatching position, and a quantity of excelsior 10 in the housing serving as a bed or nest for a chick hatched from the egg E.

The base housing 5 is preferably formed or molded as a thin-walled container of plastic material. In the present instance, said housing is formed to have a semispherical housing part 11 that is surrounded by an annular groove 12, and is provided with an outer flange 13. Integrally formed hollow portions 14 serve as support legs for said housing so that the open top thereof is horizontal. As can be seen from Fig. 2, one of said legs may be used to hold a small quantity of water W that evaporates into the interior of the housing part 11. Hence, said water-holding leg constitutes a humidifier.

The housing heating means 6 is shown as a lamp bulb 15 mounted in a socket 16 that is carried by a bracket 17 on a fastener screw 18 that also serves as a hinge or pivot around which the bracket 17 may be adjusted. Thus, the bulb 15 which provides a localized source of heat which is preferably located above the humidifier above described, and may be adjusted relative to the water in the humidifier to vary the evaporation rate thereof, as desired. The socket 16 is wired to an electric plug (not shown) by means of wires 19. In practice, a seven watt lamp bulb will ordinarily produce a suitable hatching temperature within the housing 11 and, in order to render the temperature uniform throughout, the interior of the housing 11 may be provided with a foil lining 20 that covers all of the housing except the humidifier so that evaporation therefrom is not interfered with.

The cover 7 is shown as a hemispherical dome formed of transparent plastic and, in part, covered or painted with reflective material 21 that cooperates with the foil lining 20 to render uniform the temperature in the covered housing. A clear, transparent window 22 is formed where the reflective material 21 is omitted. Said cover 7 is located with its rim 23 in the base housing groove 12, thereby imparting a generally spherical form to the incubator. By means of a key 24 in the base and a notch 25 in the cover rim, the base and cover are separably but non-rotationally connected when assembled. The fit between the cover 7 and housing 11 permits sufficient air to enter the incubator.

The vent 8 is shown as a small diameter tube that extends adjustably through the domed cover adjacent its rim in such relation to the notch 25 that the same is positioned immediately above the humidifier when said notch and the key 24 are engaged. By adjusting the vent so that its lower end has the desired spaced relationship with the water in the humidifier, proper circulation therethrough results.

It will be noted that the vent and the bulb 15 are in such close proximity that the vent is heated by said bulb, producing chimney-like draft that provides the mentioned air circulation.

While Fig. 2 shows both the egg-supporting means 9 and the excelsior 10 in place in the incubator, in practice the same are used at different times—the means 9 during the incubating period up to the time the chick within the egg is heard, and the excelsior 10 thereafter to provide a bed on which the chick breaks through the shell of the egg.

The means 9 is shown as a rack or wire holder that holds the egg small end down. The same, being formed of wire, may be bent, or extended or contracted, as desired, and does not impede the circulation of air.

Since the cover 7 may be readily removed, the egg may be reached during the incubation period so the same may be turned in its holder. Also, the humidifier may be replenished with water, as needed.

After the chick is hatched and after some hours necessary to allow acclimatizing of the new born chick, the same may be removed from its bed 10 and placed on a bed of sand 26 in a pasteboard box 27. The housing 5 may be secured to a corner of two walls 28 and 29 of said box by entering the flange 13 into a slit 30 in said wall where the same join. It will be noted from Fig. 4 that the housing 5 is inverted so that its domed part 11 suitably traps rising warm air. Now, the lamp bulb 15 may be used to provide heat beneath the brooder thus formed, the mentioned adjustment of the bracket 17 being utilized, to raise or lower the bulb as needed for best results. The brooder is completed by providing food and drink in suitable shallow receptacles 31 and 32. The space between the housing 5 and the bottom of the box 27 may be some six inches or any distance suitable to allow a chick to move freely beneath the brooder.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what is claimed and desired to be secured by Letters Patent is:

1. An egg incubator comprising a base housing having legs, a humidifier provided by a hollow in at least one of said legs opening at its upper end into said base housing and containing water, a cover for said housing provided with a vent opening the humidifier to atmosphere, localized heating means adjustably mounted within and on the wall of the base housing in adjacency to both the humidifier and the vent, and egg-supporting means in said housing, said egg-supporting means resting freely on the center area of the bottom of the base housing.

2. An incubator according to claim 1, the housing and the cover being each hemispherical and the same diameter, the cover resting freely on the housing and, in assembly, providing the incubator with a spherical egg-incubating interior.

3. An incubator according to claim 2 in which the interior surfaces of the housing and the cover are lined with heat-reflecting material, and said egg-supporting means extending into the center portion of said spherical egg-incubating interior.

4. An incubator according to claim 2 in which the interior surfaces of the housing and the cover are lined with heat-reflecting material, the cover being provided with a window for viewing the incubator interior, and said egg-supporting means extending into the center portion of said spherical egg-incubating interior.

5. An egg incubator as set forth in claim 1 and in which said vent comprises a tube extending through the cover adjacent its rim, and with its end within the base housing positioned over and adjacent the hollow in one of said legs containing water.

6. In an incubator having a hollow hemispherical base integrally provided with hollow support legs, one of which is adapted to hold water, a cover resting freely on said base, means to vent the hollow of the base carried by the cover, and means to heat the interior of the base mounted within and on a wall thereof and incubate an egg disposed therewithin, said heating means comprising an adjustably mounted lamp socket carried by the base in close adjacency to the support leg that has water therein, and a lamp bulb in said socket providing heat for evaporating said water at a rate according to the adjusted position of the socket.

7. An egg incubator as set forth in claim 5 and in which said vent tube is arranged in said base housing in proximity to said localized heating means to be heated thereby to effect upward movement of air in said tube.

8. An egg incubator comprising a base housing of hemi-spherical shape having means to support the edge thereof in horizontal position, water contained in a recess in said base housing opening into the interior thereof, a localized heat source adjustably mounted within said base housing on the wall thereof and adjacent the surface of the water, an annular projecting flange extending around the upper edge of the base housing, a hemispherical cover resting freely on the upper edge of said base housing, a vent tube passing through and adjustably supported by the cover with its lower end positioned above the surface of the water and the tube being arranged adjacent said source of heat, and a coiled wire egg support resting freely on the inside surface of the bottom of the base housing and extending into the central portion of the closed incubator.

References Cited in the file of this patent

UNITED STATES PATENTS

| | | |
|---|---|---|
| 253,074 | Loomis | Jan. 31, 1882 |
| 1,533,574 | Spratling | Apr. 14, 1925 |
| 2,764,959 | Church | Oct. 2, 1956 |